Feb. 28, 1967

A. U. BRYANT 3,306,569

FLUID FLOW CONTROL DEVICE

Filed Sept. 8, 1964

INVENTOR.
AUSTIN U. BRYANT
BY Gregg and Stidham
ATTORNEY

Feb. 28, 1967  A. U. BRYANT  3,306,569
FLUID FLOW CONTROL DEVICE
Filed Sept. 8, 1964  3 Sheets-Sheet 2
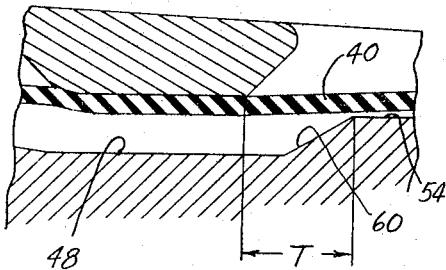
FIG-2-
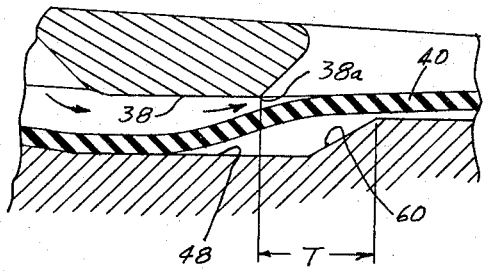
FIG-3-
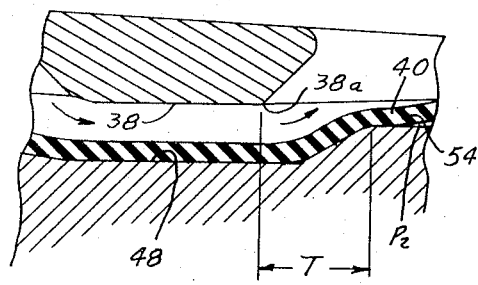
FIG-4-
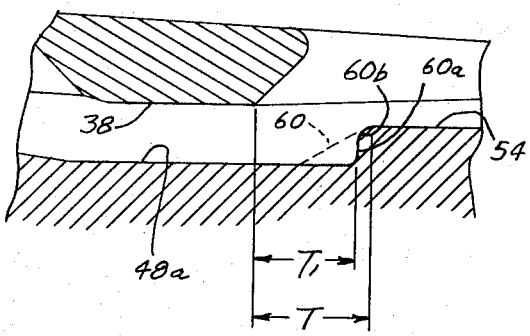
FIG-5-
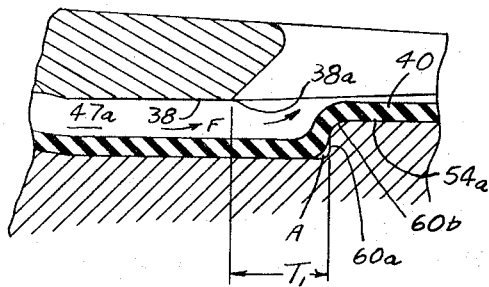
FIG-6-
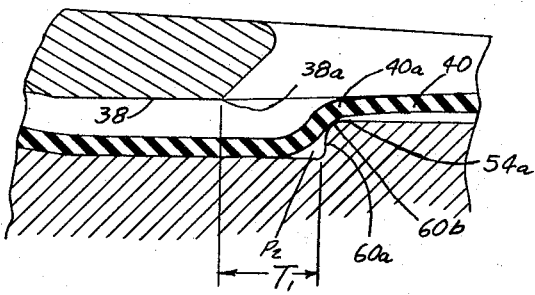
FIG-7-
INVENTOR.
AUSTIN U. BRYANT
BY Gregg and Stidham
ATTORNEY

United States Patent Office 3,306,569
Patented Feb. 28, 1967

3,306,569
FLUID FLOW CONTROL DEVICE
Austin U. Bryant, Walnut Creek, Calif., assignor to Grove Valve and Regulator Company, Oakland, Calif., a corporation of California
Filed Sept. 8, 1964, Ser. No. 394,850
6 Claims. (Cl. 251—5)

This invention relates to a fluid flow control device and, more particularly to an expansible sleeve type fluid flow valve of the type disclosed in my United States Patent No. 2,353,143 granted July 11, 1944.

Generally, the valve disclosed in that patent comprises a tubular housing having inlet and outlet flow passages around which are sealed the ends of a resilient, expansible tube or sleeve. The expansible tube is carried on a cylindrical core sleeve that has two series of lengthwise slots around it, one toward each end, with an imperforate sealing surface between them that is normally snugly engaged by the expansible sleeve. Passage through the cylindrical core sleeve is blocked by a barrier that extends across it within the sealing surface so that flow through the regulator is possible only when upstream fluid pressure acting on the expansible sleeve through the inlet end series of slots is able to overcome the tension of the expansible sleeve plus the pressure of fluid in the chamber around it to expand the sleeve outward. When this occurs, the fluid flows around the barrier and then back through the other series of slots to the outlet flow passage.

Valves of this type have been highly successful in installations requiring close control over the pressure of gas or liquids in a line. However, some difficulty has been experienced in certain instances wherein such expansible sleeve valves are used for the control of gas pressure, with a gas also being used as the control medium in the chamber surrounding the expansible sleeve. Specifically when such valves were used as gas regulators the expansible tube would expand and relax with little or no dampening until at very high flow rate it would vibrate at extremely high frequency tending to generate heat that has been known to reach temperatures sufficient to burn up the expansible tube in a very short period of time.

One solution to the problem just described resides in the use of a liquid as a control fluid to dampen the fluctuations of the expansible sleeve. This works satisfactorily, but it is highly desirable to use the same fluid that is available in the line for purposes of controlling its pressure. Hence, it is preferred that the regulator be conditioned for satisfactory operation with the gas from the line introduced as the control medium, and thus avoiding the necessity of delivering a separate fluid to the regulator.

It is, therefore, an object of this invention to provide an expansible sleeve type regulator for a gas line in which a gas may be used as the control fluid without creating high frequency vibrations of the sleeve.

According to this invention, the use of a gas as a control means is rendered feasible by the provision of a restricting surface closely surrounding the expansible tube beginning at a point downstream from the intermediate sealing surface so that expansion of the sleeve was blocked to prevent the occurrence of the violent vibrations to which it was otherwise subjected. However, where there was an abrupt transition of the relatively large diameter of the inner surface, the expansible tube was commonly distorted during expansion to restrict the flow capacity of the regulator excessively.

It is, therefore, an object of this invention to provide an expansible sleeve type regulator wherein expansion of the tube is restricted without requiring any appreciable sacrifice of flow rate.

In carrying out this invention, I provide a housing for a gas regulator including an expansible tube which is mounted on a slotted core sleeve that has a barrier across the intermediate portion thereof, the housing is provided with a specifically contoured inner surface that limits expansion of the sleeve and, at the same time, permits high flow rate. Specifically, the housing inner surface is of enlarged diameter around the expansible tube from the inlet end to a point opposite the downstream end of the central, sealing surface on the core sleeve. From this point, the surface tapers inward gradually to a small clearance around the expansible tube. Thus, from the enlarged central surface to the expansion blocking surface there is a smooth continuous transitional surface against which the resilient sleeve can be expanded without severely restricting the flow rate. This transitional surface presents no abrupt shoulders around which the tube might resist bending and tend to block the flow passage.

Other objects and advantages of this invention will become apparent from the specification following when read in conjunction with the accompanying drawings wherein:

FIGS. 2, 3 and 4 are enlarged partial section views showing a portion of the regulator of FIG. 1 illustrating the various stages of regulator operation;

FIG. 5 is an enlarged partial section view of a portion of a regulator showing schematically the relationship between the expansion-limiting surface of this invention and that of an earlier form of regulator;

FIGS. 6 and 7 are enlarged partial section views of said earlier form of regulator.

Figure 1:
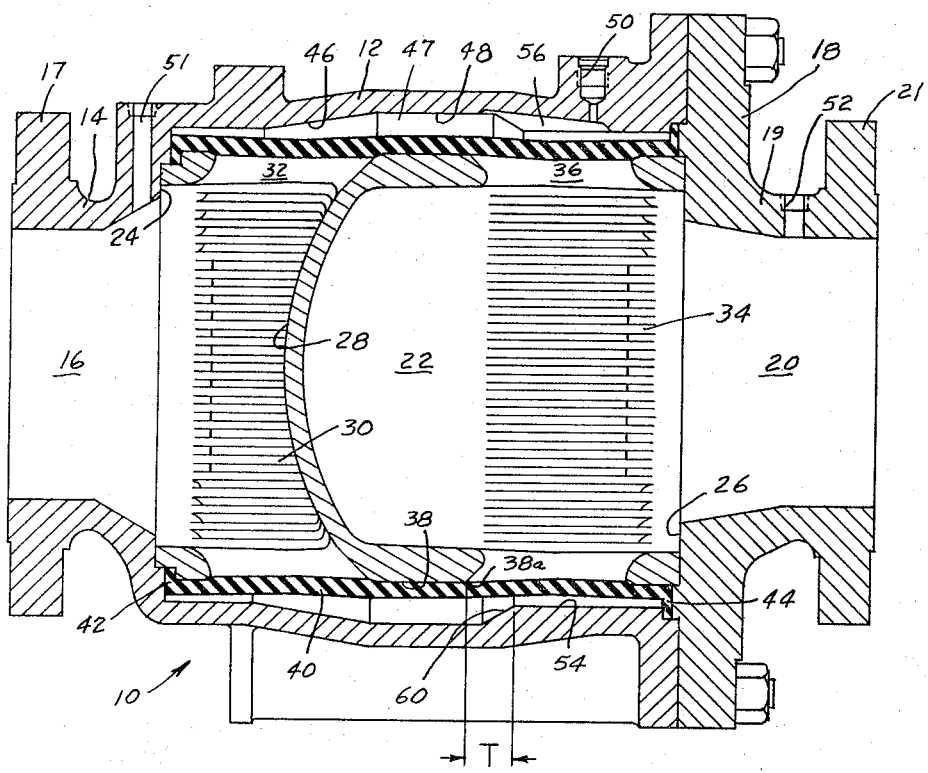
FIG. 1 is a vertical section view of an expansible sleeve type regulator embodying features of this invention.

Referring now to FIG. 1, the expansible sleeve type valve or regulator of this invention 10 includes a generally cylindrical housing 12 having an upstream hub 14 provided with a central flow passage 16 and including a flange 17 or other suitable means for connection into a pipeline (not shown). Secured on to the downstream end of the housing may be a closure plate 18 carrying a downstream hub 19 with an outlet flow passage 20 and a flange 21 for connection into the pipeline. A core sleeve 22, is positioned within the housing 12 as by seating within circular recesses 24 and 26 which are formed in the upstream wall of the housing and the downstream closure plate to provide annular shoulders within which the opposite ends of the core sleeve are retained.

The core sleeve 22 includes a dam or barrier 28 that extends completely across the inside of the sleeve to prevent flow of fluid directly therethrough, but flow around the dam is permitted by a series of slots 30 extending between ribs 32 on the upstream side and a second series of slots 34 extending between ribs 36 on the downstream side. The barrier 28 terminates at its circumference in an outer cylindrical sealing surface 38 between the two series of slots 30 and 34 that is normally, snugly embraced by an expansible tube or sleeve 40 having an inturned flange 42 at the upstream end that is clamped and sealed between the core sleeve 22 and the body 12, and an outturned flange 44 at the downstream end that is clamped between the body 12 and the downstream closure plate 18.

Adjacent the upstream end of the inlet series of slots, the inner surface of the regulator body 12 is tapered outward at 46 to form a central expansion chamber 47 defined by the larger diameter, generally cylindrical inner surface 48. A control gas may be delivered to the chamber through a duct 50 from a suitable source such as the upstream flow passage from which gas may be tapped off through the fitting 51, and perhaps regulated at a pilot (not shown) before entering the fitting 50 and then dumping at the downstream flow passage fitting 52. Thus, in operation, the control pressure augments the pressure on the resilient sleeve 40 normally to seal against the central sealing surface 38 and prevent any flow of fluid around it. However, should the upstream pressure overcome the combined force of the control fluid in the chamber 47 and the sleeve tension, the sleeve 40 is expanded away from the sealing surface 38 to permit flow of fluid out through the slots 30, around the sealing surface 38, into the downstream slots 34 and out the downstream passage 20. In this way the pressure flowing through the regulator can be closely controlled.

In early embodiments of the expansion valves of this type, the inner surface of the housing 12 tapers inward from the expansion limiting surface 48 closely adjacent the outlet end of the downstream slots 34 so that the resilient tube 40 is free to expand substantially over most of its axial length. However, when a gas is being regulated and gas is also used as the control fluid within the chamber 47, thus offering little dampening effect, high frequency vibrations were produced in the tube as maximum flow rate was approached. Such high frequency vibrations could produce sufficient heat to destroy the resilient tube in a matter of seconds. This invention, then, is directed to a specific means for overcoming this defect without resort to non-compressible dampening fluids in the control fluid chamber 47.

In carrying out this invention the inner surface of the housing 12 is modified by providing an expansion blocking surface 54 that is just slightly larger in diameter than the expansible tube 40 and extends axially over much of the downstream side of the slotted sleeve 22. That is, a substantial portion of the expansible tube on the outlet side of the slotted sleeve is embraced by the blocking surface 54. The blocking surface is effective to dampen the vibrations of the tube 40 that are set up by the flow of fluid around the barrier 28. This reduces the amplitude of the vibrational waves at the outlet end of the tube 40 and minimizes their effect in returning and building up trailing vibrational waves moving from the inlet end toward the outlet end of the tube.

Experiments have shown that optimum characteristics of flow and vibration dampening are achieved when the dimension T representing the spacing of the blocking surface is held to between .085 D and .125 D, where D equals the diameter of the slotted core 22. Preferably the dimension T is held at .115 D.

With the control fluid inlet 50 opening into the blocking surface 54, it may be desired to provide a duct or groove 56 from the control gas inlet 50 to the full expansion chamber 47 so as to insure the free and continuous exposure of the tube 40 to the control gas even though the tube 40 is expanded into firm sealing contact with the blocking surface 54.

While the blocking surface 54 in and of itself goes a long way toward alleviating the heat producing tube vibrations the gradually tapered surface 60 is also of considerable importance in that it cooperates with the blocking surface to enhance flow characteristics. This is illustrated in FIGS. 6 and 7 wherein a blocking surface 54a terminates abruptly in a radial shoulder 60a a distance $T_1$ from the edge 38a of the sealing surface 38. A small radius 60b is provided between the shoulder 60a and the blocking surface 54a.

If, as shown in FIG. 6 the control chamber 47a is exposed to a pressure, e.g. the atmosphere A, that is substantially lower than the fluid flowing in the direction of the arrows, the substantial pressure differential causes the tube to lay flat against the shoulder 60a and the blocking surface 54a. However, if as shown in FIG. 7 the usual pressure conditions obtain and the tube 40 is there exposed to a control pressure $P_2$, the flow characteristics may be altered. There, the pressure of the control fluid may increase by compression as the tube 40 expands to a point wherein it prevents further expansion of the tube before it is in snug engagement with the shoulder 60a to provide full flow opening. Moreover, there is a natural resistance of the tube to a sharp bend around the radius 60b which is not overcome by the relatively small difference in pressure between the controlling and the controlled fluid pressures. This tends to manifest itself in an inwardly extending bulge at 40a that brings it closer to the sealing surface 38 and, hence, reduces the flow passage between the tube 40 and the edge 38a of the sealing surface. Thus, while the vibrations have been dampened this is accomplished in the embodiment of FIGS. 6 and 7 only by a loss in flow capacity.

I have found that flow characteristics can be improved substantially merely by inclusion of the gradually tapered transition surface 60 even without any significant reduction in the length of the blocking surface 54. Thus, such better flow characteristics are realized by forming the transition surface 60 at a tangent to the radius 60b (FIG. 5) to merge into the expansion surface 48. The surface, being formed as a tangent provides substantially the same clearance with the downstream sealing edge 38a although the dimension T is slightly larger than $T_1$ since it is measured to the blocking surface 54 rather than to the shoulder 60a.

The transition surface is preferably tapered outwardly from the blocking surface 54 at a small angle in the order of 20° to 35°, and best results have been obtained with approximately a 30° taper. Viewing FIGS. 2, 3 and 4 it will be noted that as the tube 40 is expanded away from the surface 38 it moves downstream toward the blocking surface 54. There vibrations are dampened and, in addition, the transition surface 60 presents a smoothly contoured support for the expanded sleeve. Hence, there are no outward bulges and maximum flow characteristics are realized. Tests have shown that vibration-free flow rates are achieved that exceed those possible even without the blocking surface 54.

Figure 8:
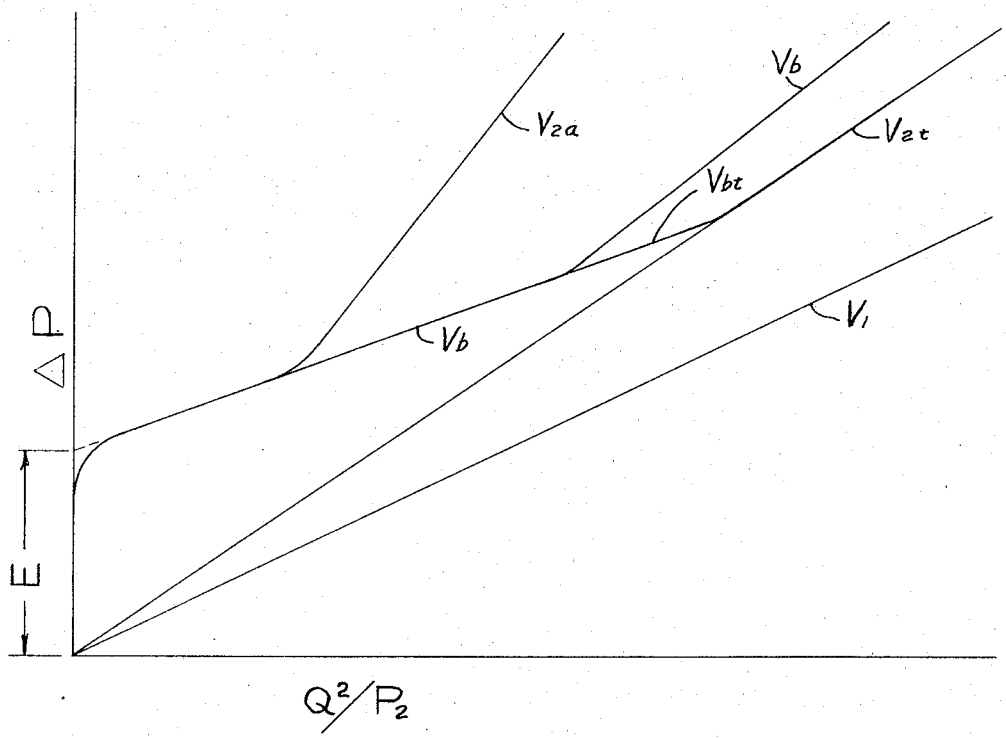
FIG. 8 is a graph showing the flow characteristic curves for various forms of expansible sleeve type gas regulators.

Referring now to FIG. 8 a series of performance curves depict the operation of expansible tube valves of this type with and without features of this invention. For gases, the rate of flow through a restricted conduit is directly related to the square root of the product of the downstream pressure and the pressure differential between upstream and downstream. Hence, the flow rate in volume per unit time squared is directly related to the product of pressure differential and downstream pressure. Stated another way, the flow rate squared divided by the downstream pressure is directly related to the pressure differential.

Hence:
$Q^2/P_2 \approx \Delta P$ where:
$\Delta P = P_1 - P_2$
$P_1$ = upstream pressure;
$P_2$ = downstream pressure; and
$Q$ = flow rate.

In the graph depicted, $\Delta P$ is plotted against $Q^2/P_2$ and the first straight line curve $V_1$ projected from the origin represents ideal operation with the valve wide open without a blocking surface and with the expansible tube exposed to the atmosphere. There, as the differential between upstream and downstream pressure is increased, $Q^2/P_2$ increases steadily at a constant rapid rate. Looking now to curve $V_{2t}$ there is depicted the theoretical flow curve for the valve with the restricting blocking surface of FIGS. 6 and 7 and with the outer surface of the expansible tube 40 exposed to atmosphere. $Q^2/P_2$ increases steadily, but at a somewhat slower rate. Curve $V_b$, $V_{bt}$ represents a theoretical flow curve with the sharply restricted blocking surface 54a of FIGS. 6 and 7, and with the control gas around the tube 40 at downstream pressure $P_2$. Before there can be any flow at all, the upstream pressure $P_1$ must exceed the downstream pressure $P_2$ by an amount necessary to overcome the tube tension. This is represented in the graphs by a value of $\Delta P$ substantially equal to E. Once the tube is expanded, further increases in pressure differential produce a rapid increase in the value of $Q^2/P_2$ and, theoretically, this would continue along the line $V_{bt}$ until maximum flow capacity is reached. Thereafter, in theory, the flow characteristics would predictably follow those represented by curve $V_{2t}$ showing theoretical flow with atmospheric pressure as control. However, in practice with the valve having an abruptly reduced blocking surface as in FIGS. 2 and 3, it was found that the flow rate was reduced at a much earlier stage in the operation, as depitced by curve $V_{2a}$. As will be seen from the graph, this condition was improved materially simply by providing the gradually tapered transition surface 60 (FIGS. 2 and 3) that enabled adequate expansion without the inward bulge 40a (FIG. 7) that restricted flow. With the transition surface 60 tests have shown that the reduction in flow rate is postponed significantly and is not nearly as drastic, both as represented by curve $V_b$. Thus, with the gradual taper to the blocking surface, flow conditions more nearly approached the theoretical $V_{2t}$.

As previously pointed out, the curves $V_b$ and $V_{2a}$ represent conditions wherein the control gas is at downstream pressure $P_2$. Tests are made under these conditions since they provide maximum flow conditions with conventional pilot systems used with valves of this type. Such pilot systems wherein gas is taken from the upstream side and discharged to the downstream side are limited in that the maximum control pressure is equal to $P_1$ and the minimum control pressure is equal to $P_2$.

While this invention has been described in conjunction with preferred embodiments thereof, it is to be understood that modifications and changes therein may be made by those skilled in the art without departing from the spirit and scope of this invention as defined by the claims appended thereto.

Having described my invention, I claim:
1. In an expansible sleeve gas flow valve comprising:
a housing having inlet and outlet gas flow passages,
a core sleeve secured in said housing with opposite open ends thereof aligned with said flow passages,
means forming two axially spaced series of inlet and outlet through slots around said sleeve,
a barrier across said sleeve intermediate said spaced series of slots,
a sealing surface around said barrier,
a resilient, expansible sleeve on said core sleeve having an intermediate sealing portion normally snugly embracing said sealing surface and sealed around said core sleeve upstream and downstream of said inlet and outlet slots, respectively,
full expansion limiting surface in said housing displaced radially outward of the sealing portion of said resilient sleeve to form a chamber around said sealing portion, and
conduit means for introducing a control pressure gas into said chamber around said expansible sleeve,
the improvement comprising:
means in said housing forming an expansion blocking surface comprising a frusto-conical portion tapering inward from said full expansion-limiting surface at an angle of between 15° and 35° with the axis of said core sleeve, and a cylindrical portion closely embracing said expansible sleeve and spaced radially outwardly therefrom,
said frusto-conical and cylindrical portions merging at a location axially intermediate the ends of said outlet series of slots.

2. The combination defined by claim 1 including:
means forming a groove extending axially in said blocking surface,
said conduit means opening into said groove.

3. The combination defined by claim 2 wherein:
said groove extends from said cylindrical portion through said frusto-conical portion to a depth at least as great as that of said full expansion-limiting surface.

4. The combination defined by claim 1 wherein:
said frusto-conical surface is disposed at an angle of approximately 30 degrees with the axis of said core sleeve.

5. The combination defined by claim 1 wherein:
said location of the merging juncture between said frusto-conical and said cylindrical portion is displaced from the downstream end of said sealing surface a distance equal to between .08 and .14 times the diameter of said core sleeve.

6. The combination defined by claim 5 wherein:
said location is displaced from the downstream end of said sealing surface a distance equal to approximately .115 times the diameter of said core sleeve.

References Cited by the Examiner

UNITED STATES PATENTS 2,622,620  12/1952  Annin _____ 251—5

FOREIGN PATENTS 132,806  5/1949  Australia.
917,423  2/1963  Great Britain.

M. CARY NELSON, *Primary Examiner.*
A. ROSENTHAL, *Assistant Examiner.*